(12) United States Patent
Numazaki et al.

(10) Patent No.: US 7,750,951 B2
(45) Date of Patent: *Jul. 6, 2010

(54) APPARATUS TO SYNCHRONIZE CHANGE CYCLE OF EXTERNAL LIGHT AND ASSOCIATED METHODOLOGY

(75) Inventors: Shunichi Numazaki, Kanagawa-ken (JP); Miwako Doi, Kanagawa-ken (JP); Minoru Ishikawa, Kanagawa-ken (JP); Akira Morishita, Tokyo (JP); Naoko Umeki, Kanagawa-ken (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 285 days.

This patent is subject to a terminal disclaimer.

(21) Appl. No.: 12/029,185

(22) Filed: Feb. 11, 2008

(65) Prior Publication Data

US 2008/0291292 A1 Nov. 27, 2008

Related U.S. Application Data

(60) Continuation of application No. 10/667,861, filed on Sep. 23, 2003, now Pat. No. 7,358,989, which is a division of application No. 09/265,598, filed on Mar. 10, 1999, now Pat. No. 6,661,453.

(30) Foreign Application Priority Data

Mar. 17, 1998 (JP) ............................. P10-066383

(51) Int. Cl.
*H04N 9/73* (2006.01)
(52) U.S. Cl. ................................. 348/227.1; 348/226.1
(58) Field of Classification Search ........................ None
See application file for complete search history.

(56) References Cited

U.S. PATENT DOCUMENTS

| 4,495,415 | A | * | 1/1985 | Kawabata | ................ 250/336.1 |
| 4,879,591 | A | * | 11/1989 | Takei | ....................... 348/224.1 |
| 4,992,885 | A | | 2/1991 | Yoshio | |
| 6,144,366 | A | | 11/2000 | Numazaki et al. | |
| 6,292,169 | B1 | | 9/2001 | Numazaki et al. | |
| 6,295,085 | B1 | | 9/2001 | Munson et al. | |
| 6,369,796 | B1 | | 4/2002 | Numazaki et al. | |
| 6,661,453 | B1 | | 12/2003 | Numazaki et al. | |
| 2001/0028333 | A1 | | 10/2001 | Numazaki et al. | |

FOREIGN PATENT DOCUMENTS

| JP | 10-177449 | 6/1998 |
| JP | 11-316645 | 11/1999 |

* cited by examiner

*Primary Examiner*—Justin P Misleh
(74) *Attorney, Agent, or Firm*—Oblon, Spivak, McClelland, Maier & Neustadt, L.L.P.

(57) ABSTRACT

An image sensor repeatedly receives a light from an object through a lens and generates images of the object. A differential image generating unit generates a differential image from at least two images. A detector detects a change cycle or an intensity of an external light. An evaluation unit evaluates an influence of the external light and derives an optimal timing in which a minimum influence of the external light is attained. A controller controls a timing of receiving the light of the image sensor, depending upon the optimal timing derived by the evaluation unit, and repeatedly synchronizes a term of two timings with the change cycle of the external light by shifting the term into the change cycle by a unit of predetermined phase difference.

17 Claims, 11 Drawing Sheets

APPARATUS TO SYNCHRONIZE CHANGE CYCLE OF EXTERNAL LIGHT AND ASSOCIATED METHODOLOGY

CROSS-REFERENCE TO RELATED APPLICATIONS

The present application is a continuation of application Ser. No. 10/667,861, filed on Sep. 23, 2003, now U.S. Pat. No. 7,358,989, which is a division of application Ser. No. 09/265,598, filed on Mar. 10, 1999, now U.S. Pat. No. 6,661,453, which claims the benefit of priority from the prior Japanese Patent Application No. 10-066383, filed Mar. 17, 1998. The entire contents of each of the above applications are incorporated herein by reference.

BACKGROUND OF THE INVENTION

1. Field of the Invention

The present invention relates to an image input apparatus and method for correctly inputting a reflected light image of an object without the influence of a change of external light such as a fluorescent lamp.

2. Description of the Related Art

Figure 1:
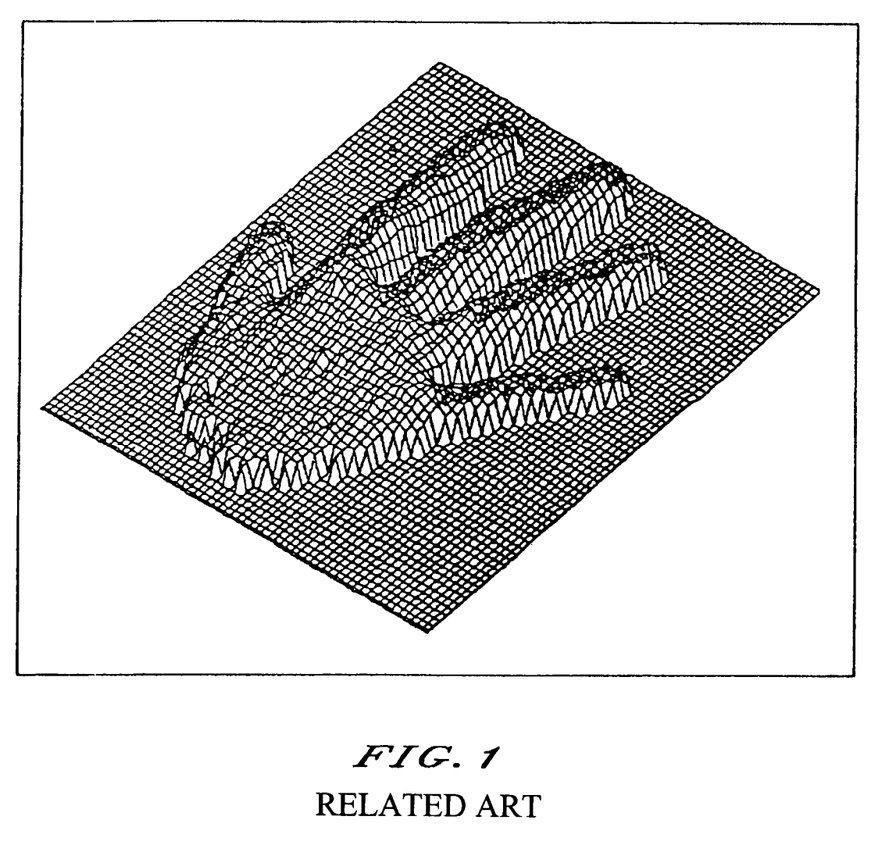
FIG. 1 is a schematic diagram of a three-dimensional reflected light image.

In a computer system of the prior art, in order to virtually generate a character model in three-dimensional space, a method for obtaining a distance image is well known, as shown in Japanese Application No. PH9-299648. In this method, first, a light is emitted to an actual object imitative of the character model. Second, light reflected from the object is obtained and an image is generated by the reflected light. In this way, the reflected light image represents the shape of the object. In this case, the reflected light from a far background is very slight. Therefore, the shape of the object is easily separated from the background in the reflected light image. If the object includes a reflected characteristic uniformly, this object reflected light closely represents the three-dimensional shape. Therefore, the object-reflected light is transformed into a three-dimensional image. Furthermore, three-dimensional movement of the object is easily extracted from a series of object-reflected light images. FIG. 1 shows, as one example, the reflected light image of a human's right hand.

In order to extract the reflected light image, the reflected light from the object is only detected without an external light such as an illumination light or sunlight. Therefore, image input operation is executed two times. At one time, a light is emitted to the object. At the other time, the light is not emitted to the object. The difference between the two images inputted at the two times is calculated as the object-reflected light. These two input operations are executed at a very short interval, and the change of quantity of the external lights between the two input operations is small. However, in an illumination environment such as that created by a fluorescent lamp whose intensity is changing, the external light changes at very short intervals between the two input operations. As a result, the quantity of the reflected light image falls because the shape of the object is not correctly represented in the reflected light image.

Furthermore, in illumination such as that created by a fluorescent lamp, the intensity basically changes in proportion to the cycle of the power supply. However, a waveform change is not clear as a sine wave and partially includes an immediate change. In short, the waveform change includes a harmonic. Therefore, in this case, the reflected light image includes the mixture of the shape of the object and the change element of the external light.

Furthermore, if two input operations are simply executed at an interval "10 ms" such as a flickerless operation of a CCD camera, the time difference between the two input operations is long. In this case, if the object is moving quickly, the quality of the reflected light image falls. As for an LED used as an emission source, the shorter the emission time is, the brighter the LED momentarily emits by power. Therefore, if the stored time of the reflected light is long, the ratio of the external light to the reflected light is large and the dynamic range to input the reflected light is narrow.

SUMMARY OF THE INVENTION

It is an object of the present invention to provide an image input apparatus for correctly inputting the reflected light image of the object without the influence of a change of the external light by detecting the most suitable phase difference between the change cycle of the external light and the input timings of the reflected light image.

According to the present invention, there is provided an image input apparatus including a camera means for inputting an image of an object, comprising: a detection means for detecting a change cycle of the intensity of an external light inputted to said camera means; a timing control means for synchronizing the change cycle of the intensity of the external light with a plurality of input timings of said camera means by changing a phase difference in order; an evaluation means for comparing each storage quantity of the external light inputted to said camera means at the plurality of input timings synchronized by said timing control means for each phase difference; and a selection means for selecting the phase difference whose difference of the storage quantities of the external light is smallest from all phase differences changed by said timing control means.

Further in accordance with the present invention there is provided an image input method in a camera system for inputting an image of an object, comprising the steps of: detecting a change cycle of the intensity of an external light inputted to said camera system; synchronizing the change cycle of the intensity of the external light with a plurality of input timings of said camera system by changing the phase difference in order; comparing each storage quantity of the external light inputted to said camera system at the plurality of input timings synchronized for each phase difference; and selecting the phase difference whose difference of the storage quantity of external light is smallest from all phase differences changed.

Further, in accordance with the present invention, there is provided a computer readable memory in a camera system for inputting an image of an object, comprising: an instruction means for causing a computer to detect a change cycle of an intensity of an external light inputted to said camera system; an instruction means for causing a computer to synchronize the change cycle of the intensity of the external light with a plurality of input timings of said camera system by changing a phase difference in order; an instruction means for causing a computer to compare each storage quantity of the external light inputted to said camera system at the plurality of input timings synchronized for each phase difference; and an instruction means for causing a computer to select the phase difference whose difference of the storage quantity of external light is smallest from all phase differences changed.

DETAILED DESCRIPTION OF THE PREFERRED EMBODIMENTS

Figure 2:
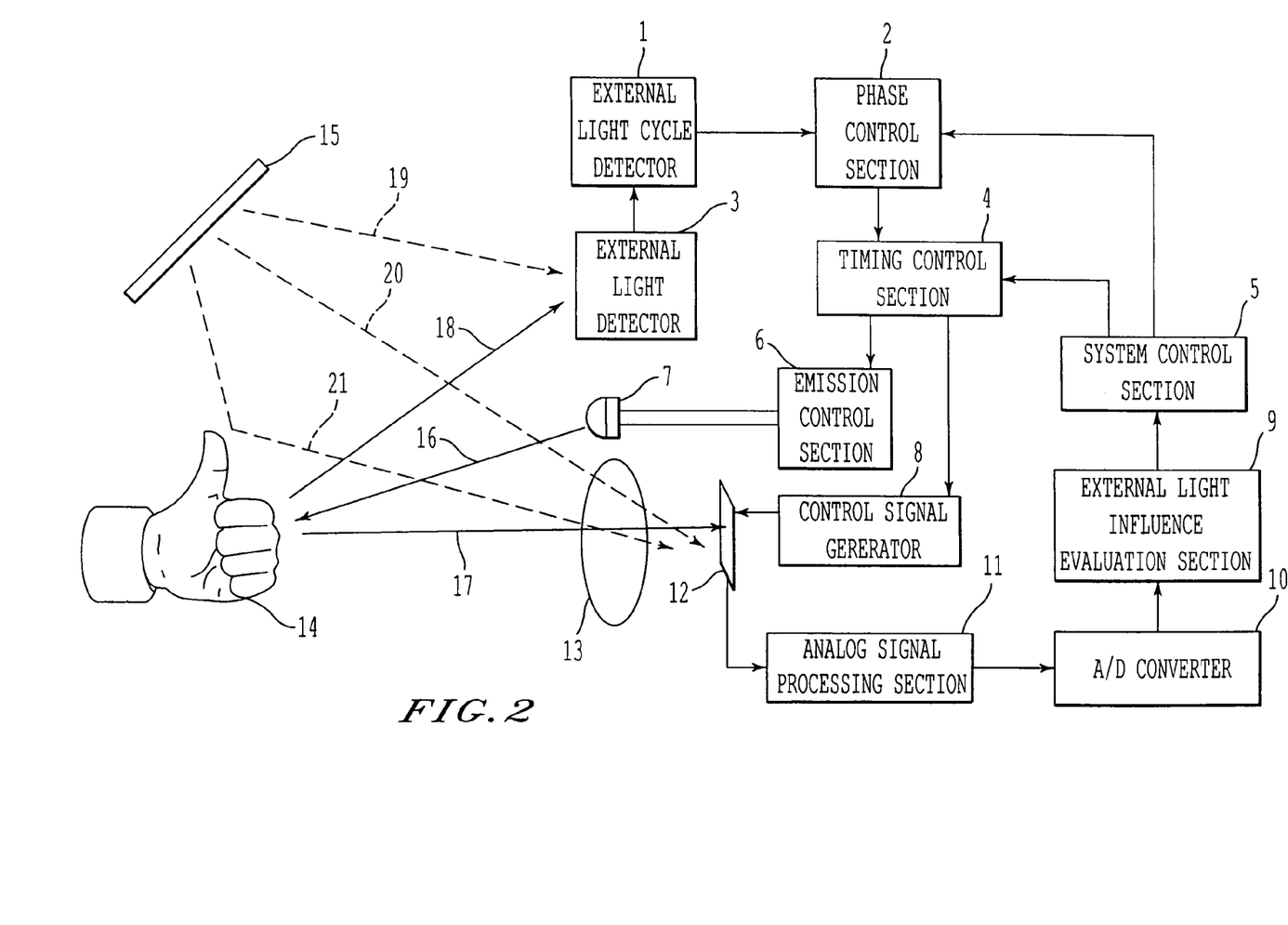
FIG. 2 is a block diagram of an image input apparatus according to the present invention.

Embodiments of the present invention are described below with reference to the drawings. FIG. 2 is a block diagram of the image input apparatus according to the present invention. An emission section 7 emits light 16 at a predetermined timing supplied by a timing control section 4 through an emission control section 6. The emitted light 16 reflects from an object 14 (a hand in FIG. 2). The reflected light 17 is received by an image sensor 12 through an imaging optical lens 13. An optical filter, not shown in FIG. 2, is located between the image sensor 12 and the optical lens 13. Most of light wave length except for the light from the emission section 7 are cut by the optical filter.

The image sensor 12 receives the light two times and outputs a difference between the two received light images in synchronization with emission. Therefore, the image sensor 12 outputs the object reflected light from the emission section 7 as the image.

Figure 3:
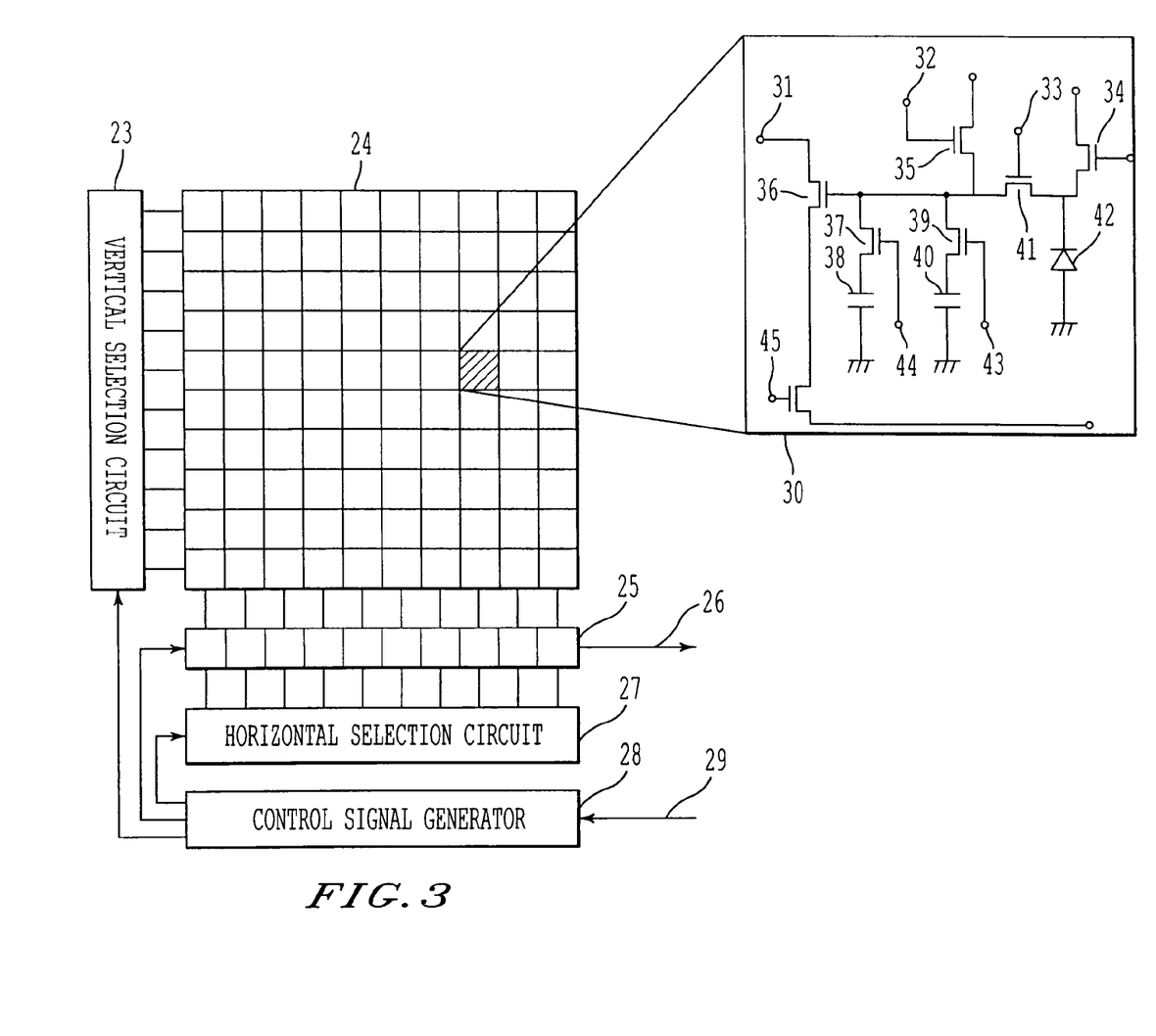
FIG. 3 is a schematic diagram of an image sensor in the image input apparatus of FIG. 2.

FIG. 3 is a block diagram of the image sensor. In FIG. 3, each light-detecting cell 30 in the image sensor includes two capacitors 38 and 40 that store electric charge. For example, one storage section 38 stores the electric charge of light-detecting in case of emission, and the other storage section 40 stores the electric charge of light-intercepting in case of non-emission. A subtraction circuit 25 outputs a difference between the electric changes stored in the two storage sections 38 and 40.

In FIG. 2, the emission control section 6 and a control signal generator 8 generate signals for controlling the emission section 7 and the image sensor 12. The timing control section 4 controls the emission control section 6 and the control signal generator 8. Output from the image sensor 12 is converted to a digital image data by A/D converter 10 through an analog signal processing section 11. The digital image data is used by a post-processing section not shown in FIG. 2 as the reflected light image from the emitted light.

In FIG. 3, each light-detecting cell includes two electric charge storage sections as a customized image sensor. However, the image sensor of the present invention is not limited to the construction shown in FIG. 3. Actually, the same processing is executed by a CCD image sensor most frequently used, or by a CMOS image sensor loaded in a digital still camera recently. In short, the image sensor in FIG. 3 is regarded as a customized CMOS image sensor. A principle to obtain the reflected light is shown in Japanese Patent Applications No. PH9-299648 and PH 11-035353.

In the present invention, two image input operations are executed at a predetermined interval. At one input timing of the two input operations, a light is emitted to the object. At the other input timing of the two input operations, the light is not emitted to the object. The difference between the two input images is output as the reflected light image of the object. In this case, if a change in the external light between the two input timings affects the quality of the reflected light image, the technique of the present invention avoids this defect.

In the present invention, an external light detector 3, an external light cycle detector 1, a phase control section 2, and an external light influence evaluation section 9 are present as shown in FIG. 2. The external light detector 3 detects the quantity of external light 19 such as the illumination light 15 or sunlight except for the light from the emission section 7. Furthermore, an optical filter to cut off the object reflected light 18 may be set in front of the external light detector 3. The external light cycle detector 1 generates a change cycle signal of the intensity of the external light in response to the output from the external light detector 3. For example, in the eastern area from the Kanto district of Japan, the intensity of the illumination light of the fluorescent lamp changes at cycle of "100 HZ". Therefore, the change cycle signal of "100 HZ" is output. The phase control section 2 controls synchronization between the emission section 7 and the image sensor 12 in response to the change cycle of the external light. In this case, the phase control section 2 outputs a suitable trigger signal to the timing control section 4 in order to synchronize the image input operation with the cycle of the external light.

As mentioned-above, the reflected light image is obtained as the difference between two images, one of which includes the object-reflected light from the emission section 7. If the intensity of the external light does not change in the interval between the two input operations, the difference between the two images represents the correct quantity of the reflected light. However, in actuality, the intensity of some external light such as light from a fluorescent lamp often changes. In this case, the change in the external light in the interval is included in the reflected light image as noise. In order to avoid this problem, a cycle of the image input operation is made to be synchronized with the change cycle of the external light. Thus, at each timing of the two input operations, the intensities of the external light are always equal.

For example, even if the intensity of the fluorescent lamp changes at the cycle of "100 HZ," the intensity is not always represented as a sine wave. Actually, in one cycle, the intensity by unit of time includes a large change part and a small change part. Therefore, in order to synchronize the cycle of the image input operation with the change cycle of the external light, this synchronization is executed by a suitable phase difference. The phase control section 2 changes the phase difference between the change cycle of the external light and the timing cycle of the image input operations by a predetermined width. In order to achieve the most suitable phase difference, the evaluation section 9 of influence of external light is used. The evaluation section 9 evaluates the change quantity of the external light between the two input timings for each phase difference. The most suitable phase difference is determined by using the evaluation result. In general, the phase difference in which the external light does not change at the two input timings is determined to be the most suitable.

Figure 4:
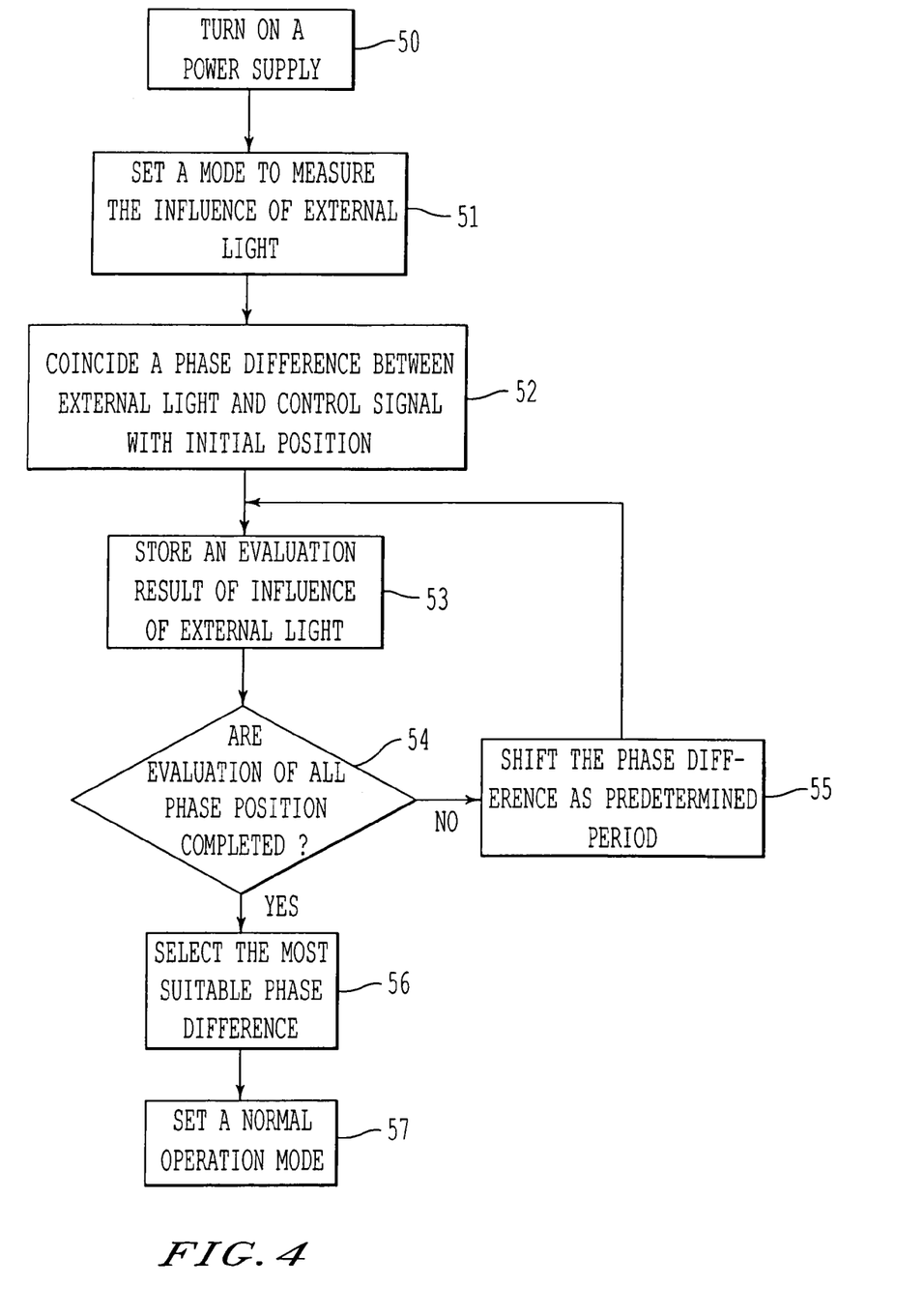
FIG. 4 is a flow chart of an image input method according to a first embodiment of the present invention.

FIG. 4 is a flow chart of the processing for determining the most suitable phase difference. First, a power supply is turned on as an initialization process (S50). Then, a mode for measuring the influence of the external light is set (S51). During the processing for determining the phase difference (S53.about.S55), the emission section 7 does not emit light because only changes in the external light are evaluated. Next, in response to the cycle signal of the external light outputted from the external light cycle detector 1, the cycle of the image input timings is gradually shifted in accordance with the cycle of the external light.

First, the phase difference between the change cycle of the external light and the cycle of two image input timings is set at an initial position (S52). Concretely speaking, a first transition of a term of the two input timings is made to coincide with a first transition of a pulse width of the change cycle of the external light. In this situation, the change quantity of the external light is evaluated and an evaluation result is stored (S53).

Next, the phase difference is shifted by a predetermined period in order (S55) and the evaluation result of the change quantity of the external light is stored in the same way. This processing is repeated until the phase difference is shifted to an end position of the change cycle of the external light (S54). The most suitable phase difference is selected from all the phase differences by referring to each evaluation result (S56). In this case, the phase difference in which the change of the external light between two input timings is smallest is selected.

However, as for the phase difference in which the change of the external light is smallest, if the change of the external light is large in a neighboring phase difference, this phase difference is not always selected. If the change of the external light is small in a predetermined width of the phase, a phase difference at a center position of the predetermined width may be selected. After completion of these processings, a normal operation mode is set in order to obtain the reflected light image (S57).

In FIG. 4, the measurement mode of influence of the external light is executed immediately after turning on the power supply. However, this measurement mode may be executed in response to a user's indication. Furthermore, if this measurement mode is automatically executed at a predetermined interval, an accidental change of the external light is coped with. For example, some cases in which new illumination is supplied or a response characteristic of the illumination changes during time passing are coped with.

Figure 5A:
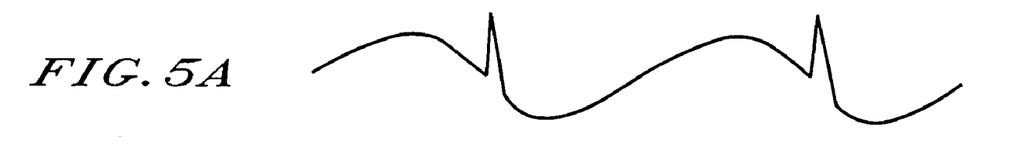
FIGS. 5A-5F are timing charts showing the relationship among a change of external light, a detected cycle signal and an operation phase.

FIGS. 5A-5F are graphs showing the change of the external light, the change cycle signal and the cycle of the image input timings. FIG. 5A shows one example of output from the external light detector 3. The intensity of the fluorescent lamp basically changes in frequency two times in response to changes in the power supply frequency. However, the waveform is not always a clear wave such as a sine wave. For example, a pointed peak and a harmonic are included as shown in FIG. 5A. In case the object-reflected light from the emission section is not attenuated by an optical filter, the harmonic is generated in the waveform. During processing to determine the most suitable phase difference, the emission section 7 does not emit light and the reflected light is not incident to the external light detector 3. However, after determining the most suitable phase difference, the emission section 7 starts emitting and such a pointed peak is generated. The external light cycle detector 1 generates a cycle signal from the waveform. In this case, if the waveform is converted to a pulse waveform by a predetermined threshold, the correct cycle is not obtained.

Figure 5B:
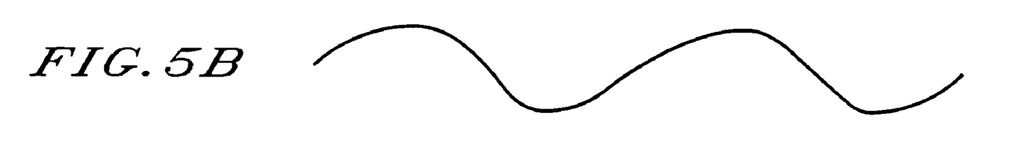
Figure 5C:
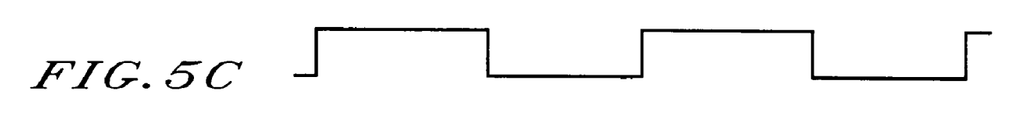
Figure 5D:
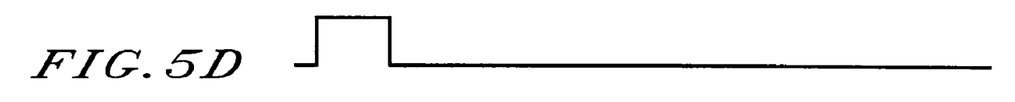
Figure 5E:
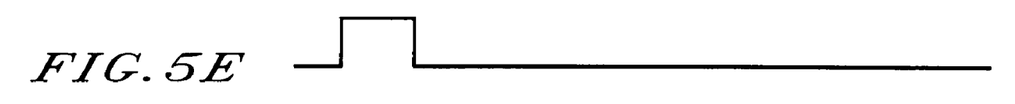
Figure 5F:
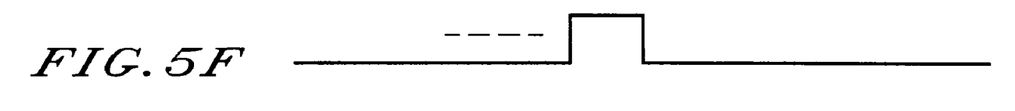

As shown in FIG. 5B, the harmonic is excluded from the waveform. The external light whose intensity changes is limited to the fluorescent lamp only and the signal of "100 HZ" or "120 HZ" is extracted as the correct waveform. Therefore, the waveform shown in FIG. 5A passes through a low-pass filter to cut off the higher frequency, and the waveform shown in FIG. 5B is obtained. By converting the waveform in FIG. 5B to a pulse waveform, a cycle signal shown in FIG. 5C is obtained. In response to this cycle signal, timing of the image input operation is synchronized as shown in FIGS. 5D, 5E, and 5F. Two timings of two input operations are included in each H level pulse. The phase difference between the H level pulse of two timings and the change cycle of the external light is gradually shifted from FIG. 5D to FIG. 5F. The most suitable phase difference is selected from all phase differences according to each evaluation result.

Figure 6A:
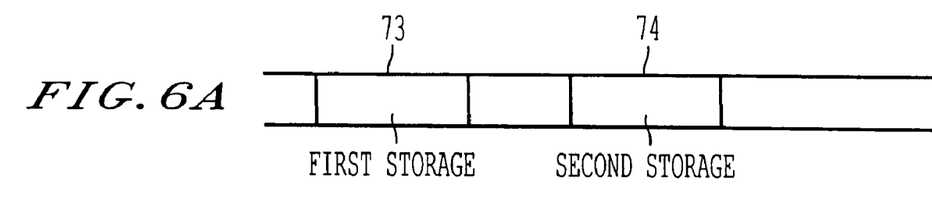
FIGS. 6A-6G are time charts showing the storage operation of two times.
Figure 6B:
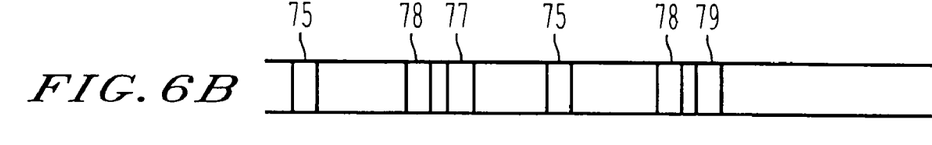

FIGS. 6A-6G are detail time charts showing the input timings in FIGS. 5D-5F. As shown in FIG. 6A, assume that a first storage 73 and a second storage 74 are executed in each H level pulse of FIGS. 5D-5F. In FIG. 6B and FIG. 2, a reset 75 of a photo diode 42, a reset 76 of the first storage section 38, a transfer 77 of electric charge to the first storage section 38, a reset 78 of the second storage section 40, and a transfer 79 of electric charge to the second storage section 40 are executed in order. When the photo diode 42 is reset, the photo diode 42 starts to store the electric charge photoelectrically converted, and the stored electric charge is transferred to the electric charge storage section 38 (40) as a first image input operation. The electric charge storage section 38 (40) is reset immediately before transfer of the electric charge.

Figure 6C:
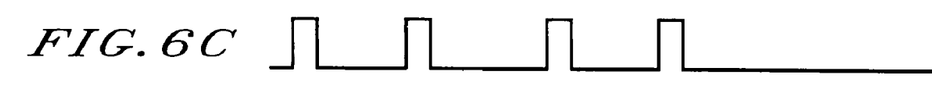
Figure 6D:
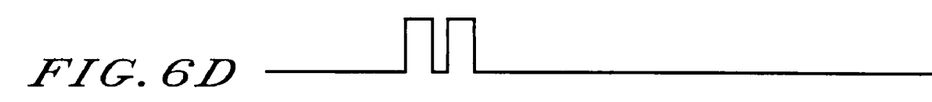
Figure 6E:
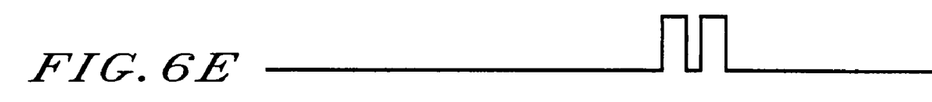
Figure 6F:
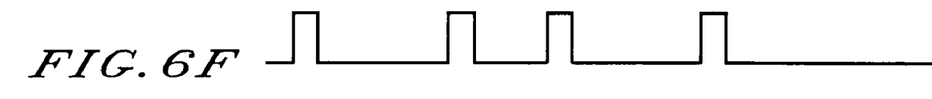

In order to reset the photo diode 42, a reset gate 35 is opened as H level by a timing shown in FIG. 6C and a transfer gate 41 is opened as H level by a timing shown in FIG. 6F. In order to reset the electric charge storage section 38 (40), in addition to the reset gate 35, a first sample gate 37 is opened by a timing shown in FIG. 6D, and a second gate 39 is opened by a timing shown in FIG. 6E.

Figure 6G:
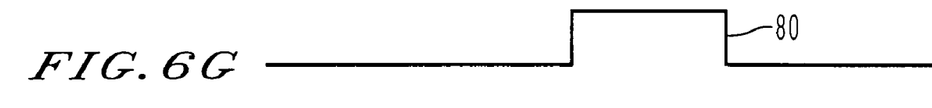

In order to transfer to the electric charge storage section 38 (40), the transfer gate 41 and the first (second) sample gate 37 (39) are opened. The electric charge as a photoelectric conversion of the incident light is continuously stored in the electric charge storage section from the reset of the photo diode to completion of the transfer. In the normal operation mode, when the emission section emits an emission control signal 80 shown in FIG. 6G, the first storage section 80 stores the electric charge in case of no-emission and the second storage section 40 stores the electric charge in case of emission.

In the external light influence measurement mode, the emission section 7 does not emit light. As a result, the first storage section 38 and the second storage section 40 respectively store the electric charge of the external light only. In this case, ideally, the storage quantity of the two storage sections 38, 40 are equal. Therefore, in case of emission, the reflected light of the object is correctly obtained as the difference between the two storage quantities.

Figure 7A:
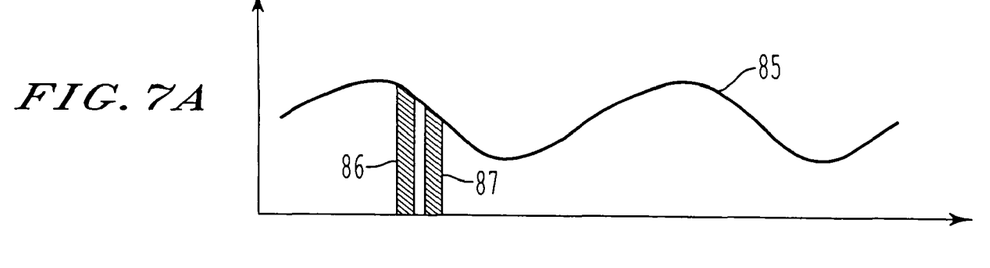
FIGS. 7A-7C are time charts showing the influence of change of external light.
Figure 7B:
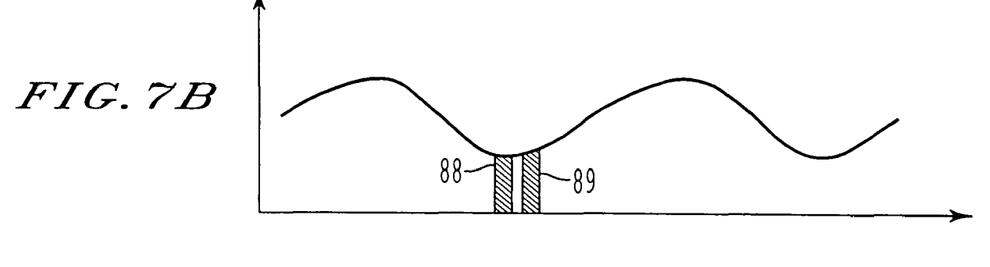
Figure 7C:
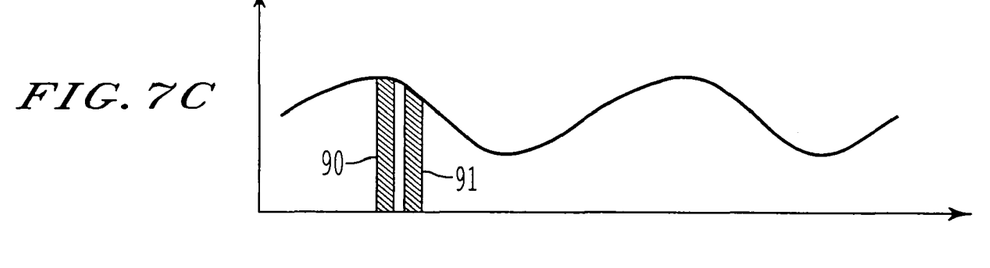

The relation between the two storage quantities and the change of the external light is explained by referring to FIGS. 7A-7C. In FIG. 7A, the change in the external light is represented as a curve 85, the storage quantity in the first storage section 38 is represented as an area 86, and the storage quantity in the second storage section 40 is represented as an area 87. If these two areas are equal, the phase difference corresponding to the two areas is the most suitable. The phase difference shown in FIG. 7B is the most suitable because the difference between the two storage quantities is smallest. The phase difference shown in FIG. 7A is not suitable because the difference is too great.

As an output of the image sensor 12, the difference between the first storage quantity and the second storage quantity is output. Accordingly, if the second storage quantity is larger than the first storage quantity, the difference represents the change of the external light. However, if the first storage quantity is larger than the second storage quantity, the difference is output as a negative value. In case of the negative value, the output of the A/D converter 10 is "0". In a normal operation, a minus signal is not output and the negative signal is uniformly converted to "0". Accordingly, for each phase difference, a mode 1 by subtracting the first storage quantity from the second storage quantity and a mode 2 by subtracting the second storage quantity from the first storage quantity are prepared. The two differences for mode 1 and mode 2 are evaluated. Alternatively, a negative-digital value is output for the negative signal, and an absolute value of the negative-digital value may be evaluated.

In FIG. 7C, the first storage quantity 90 and the second storage quantity 91 are equal. However, the situation shown in FIG. 7B is preferable to the situation shown in FIG. 7C. In case of directly detecting the illumination light such as the fluorescent lamp, the electric charge storage section 38 (40) is saturated by bright light. If both the first storage section 38 and the second storage section 40 are saturated, the difference is basically outputted as "0". However, an irregular saturation in the storage section is actually output. Therefore, it is preferable to execute the image input operation at the phase difference in which the intensity of the external light is small. In short, the most suitable phase difference is determined by not only the smallest difference between the two storage quantities, but also by the low intensity of the external light.

Figures 8A, 8B:
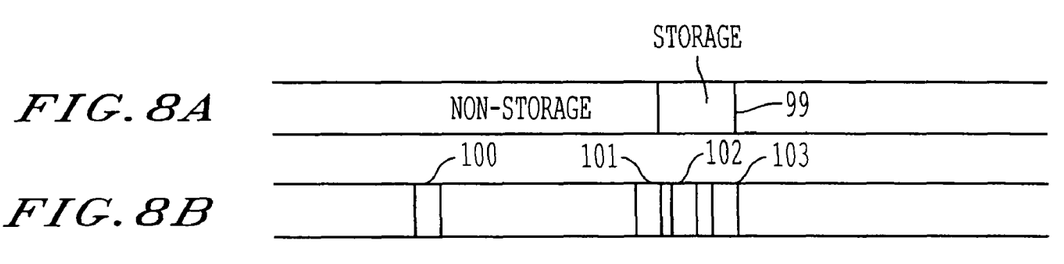
FIGS. 8A-8F are time charts showing an operation mode to evaluate an intensity of external light.
Figure 8C:
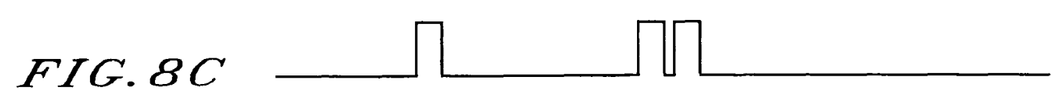
Figure 8D:
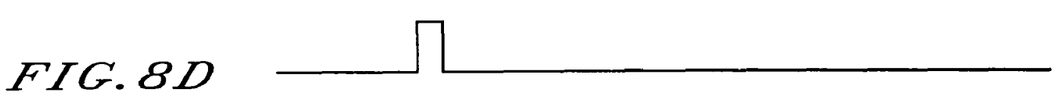
Figure 8E:
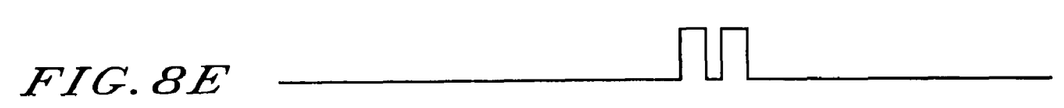
Figure 8F:
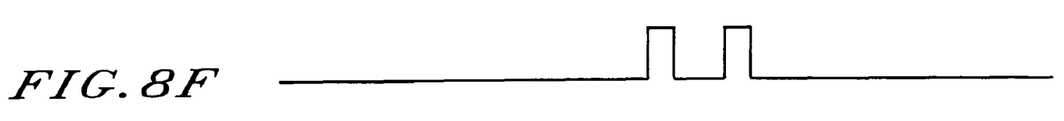

In order to evaluate the intensity of the external light, a non-difference mode is set as shown in FIGS. 8A-8F. In FIG. 8A, the first storage section 38 does not store electric charge but is reset at time 100. The second storage section 40 only stores the electric charge at time 99. This difference is output as the second storage quantity 99. In this case, the second storage period in FIG. 8A is half of the second storage period in FIG. 6A.

Figure 9A:
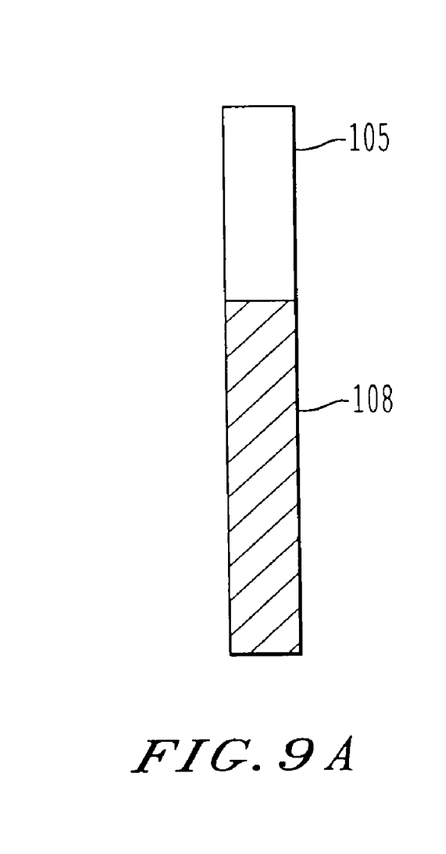
FIGS. 9A-9C are schematic diagrams showing a set of saturated quantity in a stored section.
Figure 9B:
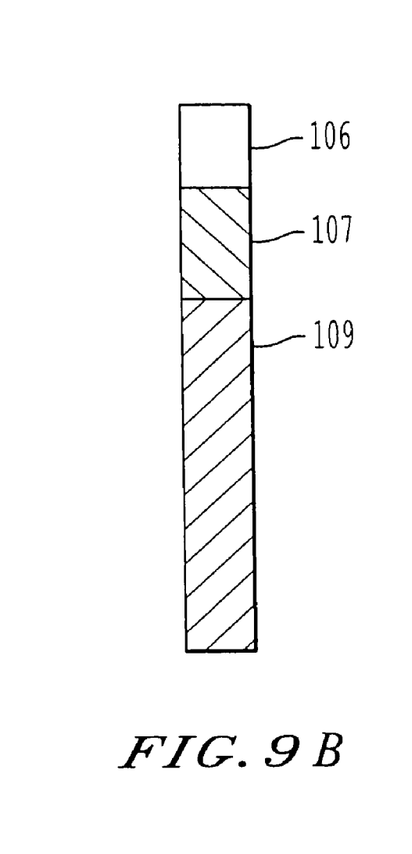
Figure 9C:
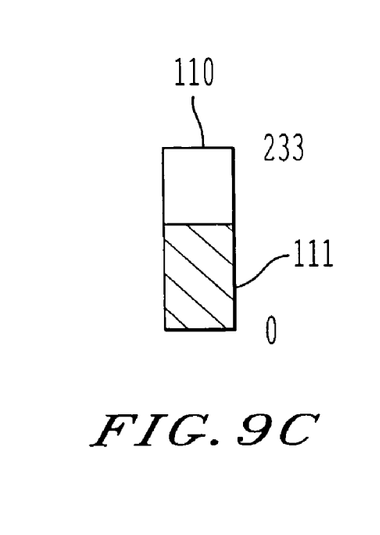

The reason for this is explained by referring to FIGS. 9A-9C. In normal operation, the difference between the first storage quantity and the second storage quantity is output and converted to digital information by the A/D converter 10. In comparison with signal level saturated by the A/D converter, the saturated quantity in each storage section 38 (40) is largely set because of the durability for the intensity of the external light. For example, as for maximum difference not saturated by the A/D converter, a saturated quantity of four times is previously set in each storage section 38 (40). In this case, even if the external light of three times the maximum reflected light, the image sensor operates correctly.

In the normal operation mode, as shown in FIGS. 9A and 9B, the first storage section stores the external light 108, and the second storage section stores the external light 109 and the reflected light 107. As shown in FIG. 9C, the difference 111 is output as a converted value "0.about.255" (8 bit in A/D). In this case, each saturated quantity 105, 106 in each storage section is larger than the full quantity of A/D output. Accordingly, even if the external light 108, larger than the reflected light, is input, the reflected light is only extracted. In other words, if the external light is stored during a period equal to normal operation, the storage section is often saturated. In case the saturated quantity of the storage section is set at four times normal quantity, the storage period is set at one fourth of the full storage of the saturated quantity. In this case, non-difference output is correctly measured. As a result, the intensity of the external light is evaluated by the non-emission.non-difference mode shown in FIGS. 8A-8F.

Figure 10:
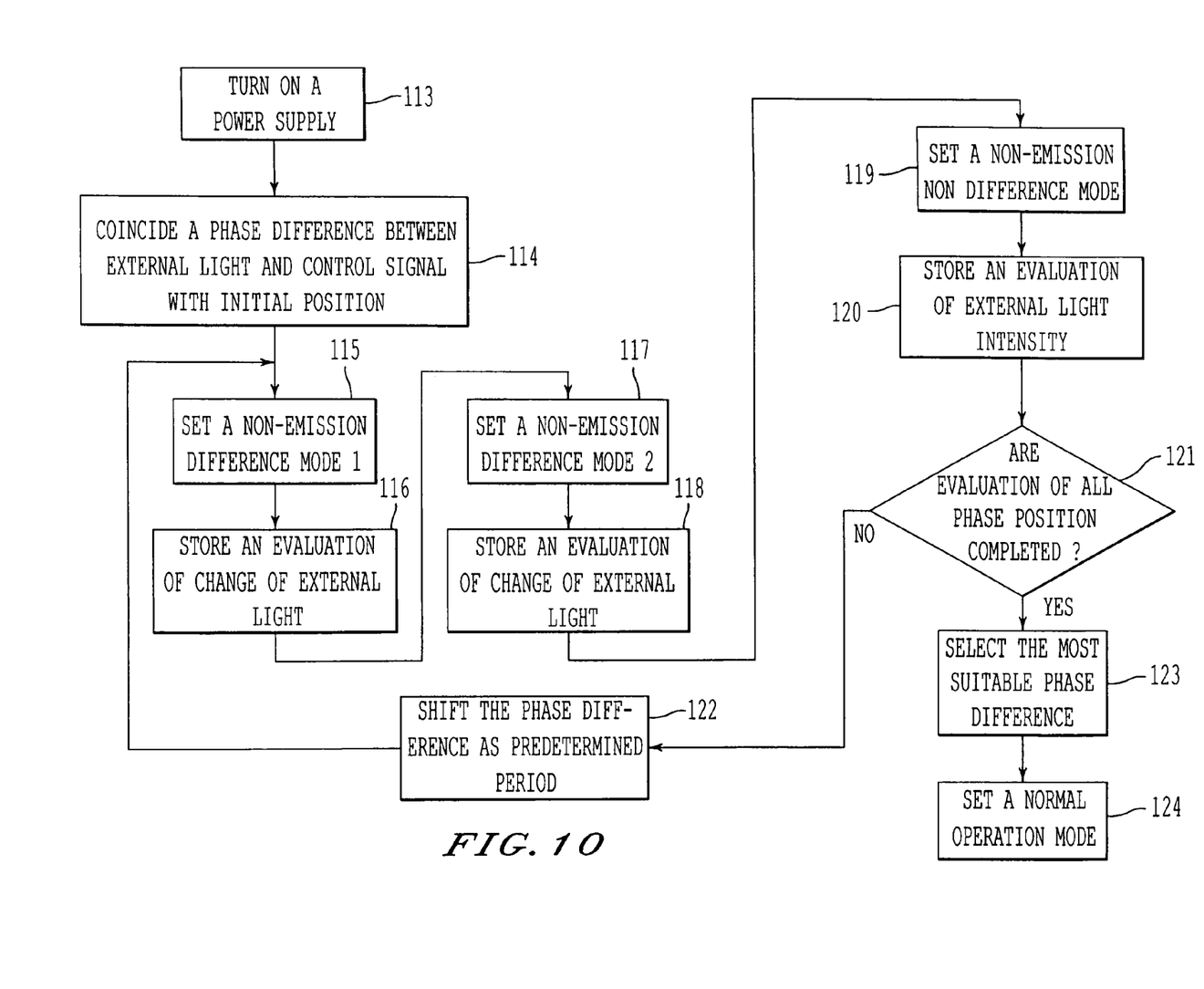
FIG. 10 is a flow chart of an image input method according to a second embodiment of the present invention.

FIG. 10 is a flow chart of the processing of a difference mode 1, a difference mode 2, and the non-emission.non-difference mode as mentioned-above. As for each phase difference, two images of the external light are inputted by unit of the difference mode 1, the difference mode 2 and the non-emission.non-difference mode. The change of the external light and the intensity of the external light for each phase difference are evaluated.

Figure 11A:
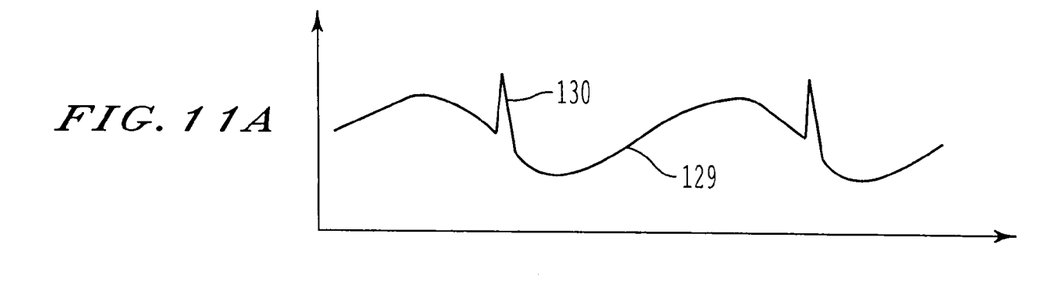
FIGS. 11A-11C are time charts showing an evaluation method for selecting the most suitable phase position.
Figures 11B, 11C:
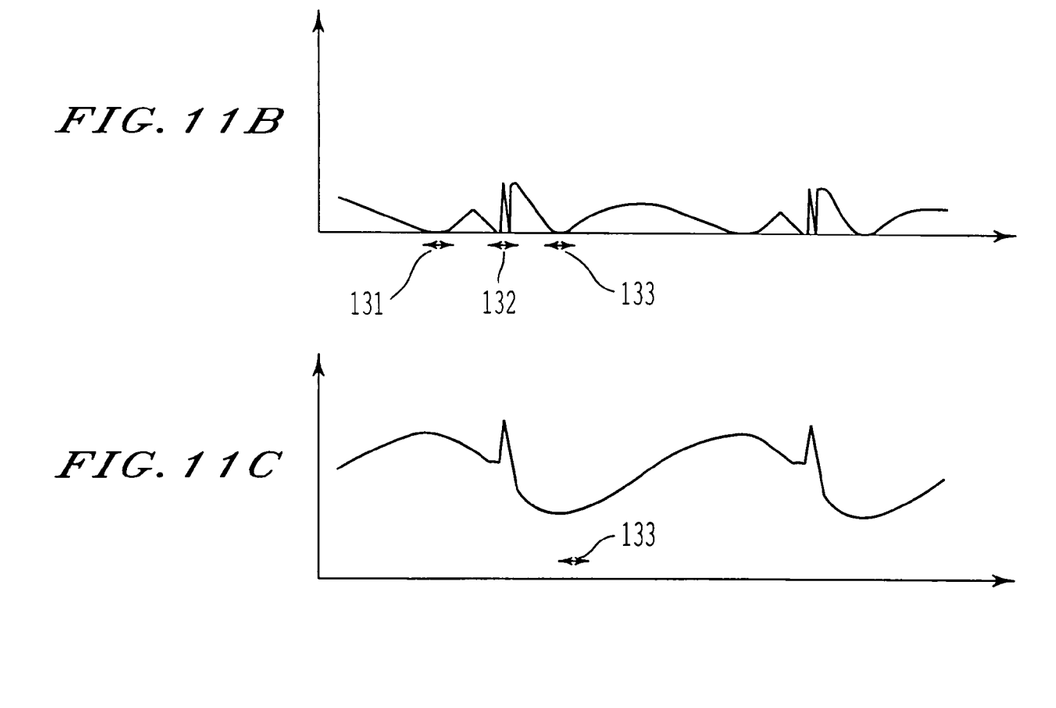

In the flow chart shown in FIG. 10, a method to determine the most suitable phase difference is explained. As for the external light shown in FIG. 11A, the larger output of difference mode 1 and difference mode 2 is shown in FIG. 11B and the output of the non-emission.non-difference mode is shown in FIG. 11C. FIG. 11B shows a graph as an absolute value of differentiated output of a graph in FIG. 11A. A graph in FIG. 11C is similar to the graph in FIG. 11A. First, in FIG. 11B, two phase positions 131 and 132 nearly equal to "0" are extracted as candidates of the most suitable phase difference. As for a phase position 132, the difference value becomes large if this phase position is slightly shifted. Therefore, in order to extract the most suitable phase difference, this phase position 132 is excluded. Next, in FIG. 11c, a phase part 133 in which the intensity of the external light is small is selected. As a result, in FIGS. 11B and 11C, the phase part 133 is determined as the most suitable phase difference.

In the above-mentioned embodiment, a normal fluorescent lamp is mainly assumed to be an external element. In case of an inverter fluorescent lamp in which the change period of the external light is short, the present invention is applied. For example, as for the inverter fluorescent lamp, the intensity changes by a frequency of "40 KHZ," and one cycle of the change of the intensity is about 25 micro seconds. In the image input apparatus of the present invention, a typical storage period per one time is about 2 milliseconds. In short, the storage period per one time includes eighty cycles of the change in intensity. In the case where an external light source is mainly the inverter fluorescent lamp, the influence of the change in the external light is small. However, in an actual inverter fluorescent lamp, the intensity slowly changes by a power supply period during changing by "40 KHZ" because the change of the power supply remains in the high frequency signal generated by the inverter. If this slow change affects the external light, the image input apparatus of the present invention is effective. In this case, the external light cycle detector 1 cuts off the high frequency element by a low-pass filter, and only a cycle of slow change remains. Therefore, this influence is excluded by the above-mentioned processing based on the cycle of slow change.

Furthermore, if a phase difference for the change cycle of "40 KHZ" appears to be an error, a cycle signal of the change cycle of "40 KHZ" is detected at the same time, and a storage processing in the storage section begins by a trigger such as a first transition of the cycle signal. By detecting both a cycle signal of "40 KHZ" and a cycle signal of the slow change, a cycle of the image input operation is synchronized with the cycle signal of the slow change, and the timing of the first image input is executed by a trigger of a first transition of the cycle "40 KHZ." In this case, the influence of the external light from the inverter fluorescent lamp is greatly suppressed.

As mentioned-above, in the present invention, the change cycle of the external light is detected and the reflected light image is input in synchronization with the change cycle. In the measurement mode, whenever the phase difference between the change cycle of the external light and the timings of the image input operation is changed by unit of a predetermined period, the change quantity of the external light is evaluated for each phase difference. Accordingly, the most suitable phase difference whose change quantity is smallest is selected from all phase differences, and the reflected light image is input in synchronization with the most suitable phase difference.

Furthermore, in the present invention, in order to determine the most suitable phase difference, the intensity of the external light is additionally evaluated. As a result, the image input operation is executed during a period of relative dark external light. Therefore, even if the illumination light is directly input, the image is obtained without saturation of the storage section. In the case of natural light such as sunlight except for the fluorescent lamp, the durability of the storage capacity is maximized.

In the above-mentioned embodiment, two images, one of which includes the object-reflected light, are input while the emission section emits light at the same time as the two input operations. However, the present invention is elective for all image input apparatuses in which a difference between two images or two optical quantities of an optical-detecting element are output. For example, a moving object and a stationary object are separated in the image by calculating the difference between two images. In general, a part whose difference is "0" represents the stationary object and a background, and the part whose difference is a large value represents the moving object. In this case, if the change of the intensity of the illumination light affects the difference, the background is erroneously recognized as the moving object. In order to avoid this problem, the present invention is applied.

Furthermore, the present invention is effective for an ordinary camera apparatus. In case that a series of images such as a computer vision is processed to extract some information, a change in the illumination light produces noise. In the present invention, the series of images without the noise of the change in the illumination light is easily obtained in the same way as in the above-mentioned embodiment.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image input system comprising:
a lens;
an image sensor repeatedly receiving a light from an object through the lens and generating images of the object;
a differential image generating unit configured to generate a differential image from at least two images;
a detector detecting a change cycle or an intensity of an external light;
an evaluation unit configured to evaluate an influence of the external light and to derive an optimal timing in which the minimum influence of the external light is attained; and
a controller controlling a timing of receiving the light of the image sensor, depending upon the optimal timing derived by the evaluation unit, and repeatedly synchronizing a term of two timings with the change cycle of the external light by shifting the term into the change cycle by a unit of predetermined phase difference.

2. The image input system according to claim 1, wherein the image sensor respectively receives the light from the object at the two timing whenever the term of the two timings is shifted into the change cycle by the unit of predetermined phase difference.

3. The image input system according to claim 2, wherein the evaluation unit respectively calculates a difference between two storage quantities of the external light received at the two timings of each shifted term, and selects one difference which is smallest from all differences of all shifted terms.

4. The image input system according to claim 3, wherein the evaluation unit selects the one difference if at least one of the two storage quantities from which the one difference is calculated is below a threshold.

5. The image input system according to claim 3, wherein the evaluation unit decides a shifted term of two timings of the two storage quantities from which the one difference is calculated as the optimal timing.

6. The image input system according to claim 5, further comprising:
a light source configured to emit a light to the object.

7. The image input system according to claim 6, wherein the controller controls the light source to emit the light in synchronization with one of two timings of the shifted term.

8. The image input system according to claim 7, wherein the image sensor respectively receives the light from the object at the two timings of the shifted term, and generates two images from two received lights.

9. The image input system according to claim 8, wherein the differential image generating unit calculates the differential image between the two images as a reflected light image of the object.

10. An image input system comprising:
a lens;
a light source emitting a light to an object;
an image sensor repeatedly receiving the light from the object through the lens and generating images of the object;
a differential image generating unit configured to generate a differential image from at least two images;
a detector detecting a change cycle or an intensity of an external light superposed on the light from the light source;
an evaluation unit configured to evaluate an influence of the external light and to derive an optimal timing in which the minimum influence of the external light is attained; and
a controller controlling a timing of receiving the light of the image sensor and a timing of emitting a light of the light source, both depending upon the optimal timing derived by the evaluation unit, and repeatedly synchronizing a term of two timings with the change cycle of the external light by shifting the term into the change cycle by a unit of predetermined phase difference.

11. The image input system according to claim 10, wherein the image sensor respectively receives the light from the object at the two timing whenever the term of the two timings is shifted into the change cycle by the unit of predetermined phase difference.

12. The image input system according to claim 11, wherein the evaluation unit respectively calculates a difference between two storage quantities of the external light received at the two timings of each shifted term, and selects one difference which is smallest from all differences of all shifted terms.

13. The image input system according to claim 12,
wherein the evaluation unit selects the one difference if at least one of the two storage quantities from which the one difference is calculated is below a threshold.

14. The image input system according to claim 12,
wherein the evaluation unit decides a shifted term of two timings of the two storage quantities from which the one difference is calculated as the optimal timing.

15. The image input system according to claim 14,
wherein the controller controls the light source to emit the light in synchronization with one of two timings of the shifted term.

16. The image input system according to claim 15,
wherein the image sensor respectively receives the light from the object at the two timings of the shifted term, and generates two images from two received lights.

17. The image input system according to claim 16,
wherein the differential image generating unit calculates the differential image between the two images as a reflected light image of the object.

* * * * *